(12) United States Patent
Rangaraj Manavalan et al.

(10) Patent No.: US 10,524,270 B2
(45) Date of Patent: Dec. 31, 2019

(54) CONTENTION-BASED RESOURCE ALLOCATION

(71) Applicant: Hewlett Packard Enterprise Development LP, Houston, TX (US)

(72) Inventors: Karthik Rangaraj Manavalan, Chennai (IN); Sachin Ganu, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/451,371

(22) Filed: Mar. 6, 2017

(65) Prior Publication Data
US 2018/0255555 A1    Sep. 6, 2018

(51) Int. Cl.
| | |
|---|---|
| *H04W 72/00* | (2009.01) |
| *H04W 28/26* | (2009.01) |
| *H04W 16/10* | (2009.01) |
| *H04W 76/11* | (2018.01) |
| *H04W 72/08* | (2009.01) |
| *H04W 72/12* | (2009.01) |
| H04W 84/12 | (2009.01) |

(52) U.S. Cl.
CPC ....... *H04W 72/082* (2013.01); *H04W 72/085* (2013.01); *H04W 72/1257* (2013.01); *H04W 84/12* (2013.01)

(58) Field of Classification Search
CPC ............ H04W 72/0446; H04W 72/048; H04L 47/2433
USPC .................................................. 370/230, 414
See application file for complete search history.

(56) References Cited

U.S. PATENT DOCUMENTS

| | | | | |
|---|---|---|---|---|
| 2006/0224706 | A1* | 10/2006 | Kudo ...................... | G06F 9/505 709/220 |
| 2008/0090580 | A1* | 4/2008 | Sung ..................... | H04W 16/02 455/450 |
| 2010/0220618 | A1* | 9/2010 | Kwon ............... | H04W 72/1284 370/252 |
| 2010/0329199 | A1 | 12/2010 | Liu et al. | |
| 2011/0286344 | A1* | 11/2011 | Hanaoka ............... | H04W 36/26 370/252 |

(Continued)

FOREIGN PATENT DOCUMENTS

| | | |
|---|---|---|
| WO | WO-2007011182 | 1/2007 |
| WO | WO2016154779 A1 | 10/2016 |

OTHER PUBLICATIONS

Karaca, M. et al., "Resource Management for OFDMA Based Next Generation 802.11 WLANs", https://arxiv.org/pdf/1602.07104.pdf, Apr. 1, 2016, 8 pages.

(Continued)

*Primary Examiner* — Khaled M Kassim
*Assistant Examiner* — Jason A Harley
(74) *Attorney, Agent, or Firm* — Brooks, Cameron & Huebsch, PLLC

(57) ABSTRACT

Examples implementations relate to contention-based resource allocation. In some examples, a method can include determining a station of stations associated with an access point having a contention window value or a resource value less than a total amount of resource units (RU) of a particular protocol data unit (PCU) of the access point, and allocating a RU of the RUs to the determined station based on a user parameter equal to a lesser of the resource value or a value of a RU limit of the determined station.

15 Claims, 5 Drawing Sheets

(56) References Cited

U.S. PATENT DOCUMENTS

| | | | |
|---|---|---|---|
| 2013/0259018 A1* | 10/2013 | Ji | H04W 74/0808 |
| | | | 370/338 |
| 2013/0337749 A1* | 12/2013 | Wang | H04W 72/10 |
| | | | 455/41.2 |
| 2014/0157075 A1* | 6/2014 | Kim | G06F 11/1004 |
| | | | 714/749 |
| 2015/0009814 A1* | 1/2015 | Wu | H04W 28/0289 |
| | | | 370/230 |
| 2015/0319772 A1 | 11/2015 | Halabian et al. | |
| 2016/0021682 A1 | 1/2016 | Wang et al. | |
| 2016/0073387 A1* | 3/2016 | Yang | H04L 5/0048 |
| | | | 370/329 |
| 2016/0105836 A1 | 4/2016 | Seok | |
| 2016/0105900 A1* | 4/2016 | Zhang | H04W 74/0816 |
| | | | 370/338 |
| 2016/0150557 A1 | 5/2016 | Lee et al. | |
| 2016/0165598 A1 | 6/2016 | Azizi et al. | |
| 2016/0192351 A1* | 6/2016 | Kwon | H04W 72/0413 |
| | | | 370/329 |
| 2016/0295434 A1* | 10/2016 | Safavi Naeini | H04W 40/04 |
| 2016/0316458 A1* | 10/2016 | Kwon | H04L 27/2601 |
| 2016/0330058 A1* | 11/2016 | Chen | H04L 27/2607 |

OTHER PUBLICATIONS

Seong et al., "Optimal resource allocation for OFDMA Downlink systems", in 2006 IEEE International Symposium on Information Theory, Jul. 2006, pp. 1394-1398.

* cited by examiner

CONTENTION-BASED RESOURCE ALLOCATION

BACKGROUND

Wireless networks include an access point that is controlled by a network device such as a controller. The network device can be utilized to manage, configure, monitor, and/or troubleshoot operation of the access point. The network device can be utilized to encrypt and/or decrypt data packets received from the access point. The network device can be utilized to configure the access point and/or change a configuration of the access point.

DETAILED DESCRIPTION

Figure 1:
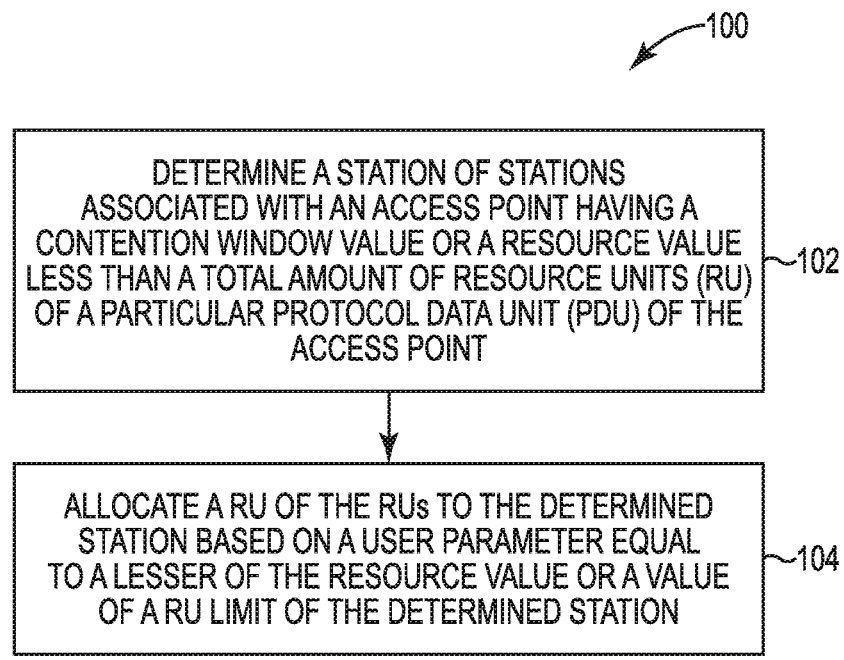
FIG. 1 illustrates a flow diagram for an example of a method of contention-based resource allocation according to the disclosure.

Wireless networks may be deployed to provide various types of communication to multiple users through the air using electromagnetic waves. As a result, various types of communication may be provided to multiple users without cables, wires, or other physical electric conductors to couple devices in the wireless network. Examples of the various types of communication that may be provided by wireless networks include voice communication, data communication, multimedia services, etc.

An example of a wireless network is a wireless local area network (WLAN). As used herein, the term "wireless local area network (WLAN)" can, for example, refer to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network. WLANs may include multiple stations, controllers (e.g., WLAN controller(s)), and/or access points (APs) that may communicate over wireless channels. That is, WLANs may include stations and/or access points (APs) that may communicate over a plurality of wireless channels. As used herein, an AP can be a networking hardware device that allows a wireless-compliant device (e.g., a station) to connect to a network, while a controller may perform configuration operations and/or authentication operations on APs and/or station.

An AP may provide connectivity with a network such as the internet to the stations. As used herein, a station can be a device that has the capability to use the Institute of Electrical and Electronics Engineers (IEEE) 802.11 protocol. Examples of stations include smart phones, laptops, physical non-virtualized computing devices, personal digital assistants, etc. In some examples, a station may be a device that contains an IEEE 802.11-conformant media access control (MAC) and physical layer (PHY) interface to a wireless medium (WM).

Wireless networks such as WLANs such as those defined in the IEEE wireless communications standards, e.g., IEEE 802.11a, IEEE 802.11n, IEEE 802.11 ac, 802.11ax can use various wireless communication technologies, for example, orthogonal frequency division multiplexing (OFDM), a single-in-single-out (SISO), and/or a multiple-in-multiple-out (MIMO) communication approach, among other types of approaches to transmit and receive signals.

Orthogonal Frequency Division Multiplexing Scheme (OFDM) is a method of encoding digital data on multiple carrier frequencies. A multiple access scheme is enabled in Orthogonal Frequency Multiple-Division Access (OFDMA), in which sub-carriers of a transmitting medium (e.g., AP) are shared among multiple stations associated with the transmitting medium. A resource allocation according to the OFDMA considers additional factors in allocating resources of the transmitting medium, for example, such as when to transmit; how often to transmit, and at what power to transmit. As such, the resource allocation according to the OFDMA is flexible, and often complex. Therefore, altering resource allocation according to the OFDMA is desirable.

Examples of the disclosure relate to a contention-based resource allocation. In some examples, a method can include determining a station of stations associated with an access point having a contention window value or a resource value less than a total amount of resource units of a particular protocol data unit (PDU) of the access point, and allocating a RU of the RUs to the determined station based on a user parameter equal to a lesser of the resource value or a value of a RU limit of the determined station. As used herein, contention can refer to a value of an amount of resource units that each station associated with an access point contends for. Desirably, contention-based optimization of resource allocation reduces a gap between an amount of resources each station independently contends for and an amount of resources actually allocated to each station while employing "fairness" and "QoS demands".

As used herein, 'wireless local area network' (WLAN) can refer to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network As used herein, 'network device' can include a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. The network device may be adapted with circuitry to support wireless connectivity with other network devices being part of a wireless network.

As used herein, 'AP' can refer to receiving points for any known or convenient wireless access technology which may later become known. Specifically, the term AP is not intended to be limited to IEEE 802.11-based APs. An AP includes a quantity of PDUs, which is a data unit by which information is delivered (e.g., allocated) to a station, for instance, by a physical layer. In various examples, each of the quantity of PDUs includes a quantity of subcarriers, which can be referred to as tones or frequency tones. In the OFDMA, each PDU can be further divided into a second data unit with a smaller granularity, and the second data unit can be referred to as a resource unit (RU). As such, in OFDMA, resources can be allocated at a level of the RU such that the resources of the PDU are shared among stations.

As used herein, "allocation" can include scheduling and transmitting resources, for instance, in the OFDMA. For example, allocation of resources in an AP can include scheduling a particular resource of the AP to transmit to a particular station, for instance, at a later time, and actual transmission of the particular resource to the particular station as scheduled.

FIG. 1 illustrates a flow diagram for an example of a method 100 of a contention-based resource allocation according to the disclosure. At 102, the method 100 can include determining a station of stations associated with an access point having a contention window value or a resource value less than a total amount of RUs of a PDU of the access point. In some examples, various constraints of a station may be considered in determining the station at 102. For example, a contention window value of the station having a strict constraint delay may be further adjusted such that the station is determined for the resource allocation.

As user herein, a resource value can refer to an amount of RUs that a station contends for. In various examples, each station can independently contend for the resource value independently.

Figure 2:
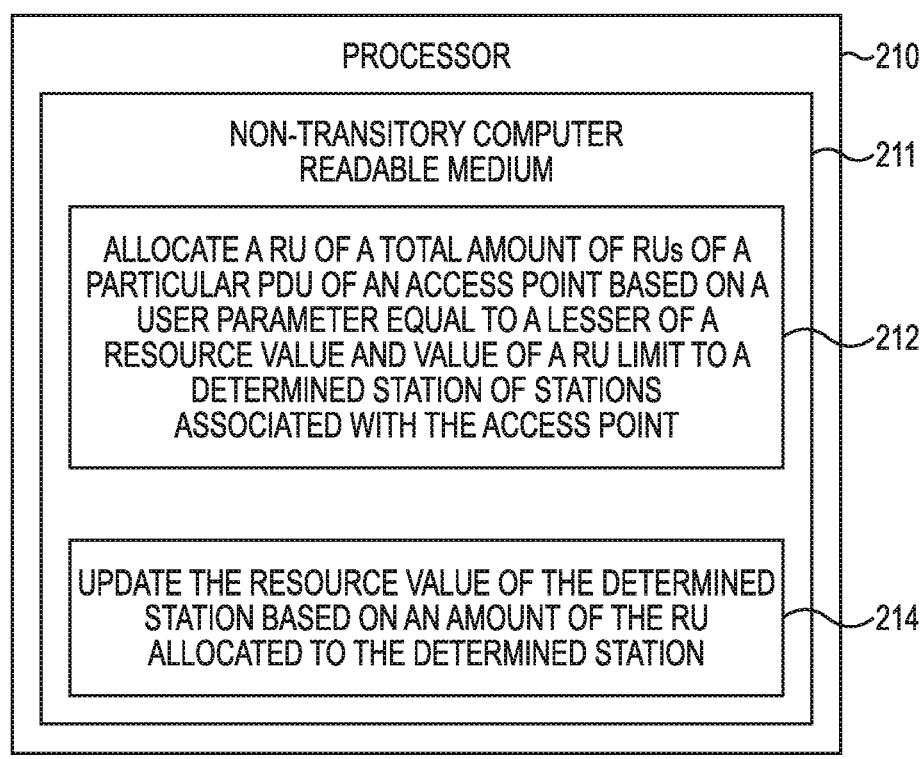
FIG. 2 illustrates a diagram of an example of a non-transitory computer readable medium and processor for a contention-based resource allocation according to the disclosure.

As used herein, a RU limit can refer to an amount of RUs not to be exceeded when allocating to a station in a single iteration (e.g., an iteration as described in association with FIG. 2). In various example, a RU limit of a station associated with the access point can be determined based on a resource value of the station, for instance, prior to allocating a RU of a PDU according to the disclosure, as described herein.

At 104, the method 100 can include allocating a RU of the RUs to the determined station based on a user parameter equal to a lesser of the resource value or a value of a RU limit of the determined station. In various examples, allocating based on the user parameter can include allocating the RU of the RUs to the determined station based on whether the user parameter is greater than an available RU of the PDU. For example, the method 100 can include allocating an amount of RUs equal to a numeric value of a lesser of a value of the user parameter less a value of the available RU or the value of the available RU to the determined station responsive to determining that the user parameter is greater than the available RU. In some examples, the method 100 can include allocating an amount of RUs equal to a numeric value of the user parameter to the determined station responsive to determining that the user parameter is not greater than the available RU.

In various examples, the method 100 can include including updating the resource value of the determined station upon the determined station being allocated the RU of the RUs. In some examples, updating the resource value of the determined station is further based on a transmission failure. For example, responsive to determining that a RU that is scheduled to be transmitted is not actually transmitted (e.g., a transmission failure), the resource value of the determined station may be updated as if the RU were not originally allocated. However, in some examples, a RU scheduled to be retransmitted (e.g., subsequent to an occurrence of the transmission failure) may not be indicated as "available" such that the amount of RUs are not re-allocated to a different station. That is, when a transmission failure occurs, the method properly indicates that a RU associated with the transmission failure is yet to be transmitted, but is not available to be allocated to a different station.

FIG. 2 illustrates a diagram of an example of a non-transitory computer readable medium 211 and processor 210 for a contention-based resource allocation according to the disclosure. Processor 210 may be a central processing unit (CPU), microprocessor, and/or other hardware device suitable for retrieval and execution of instructions such as those stored in non-transitory computer readable medium 211. The non-transitory machine readable medium 211 may be any type of volatile or non-volatile memory or storage, such as random access memory (RAM), flash memory, read-only memory (ROM), storage volumes, a hard disk, or a combination thereof.

In various examples, the medium 211 may store instructions 212 executable by the processor 210 to allocate a RU of a total amount of RUs of a respective PDU (e.g., first PDU) of an access point based on a user parameter being equal to a lessor of a resource value and value of a RU limit to a determined station of stations associated with the access point. A station is determined (e.g., to be allocated the RU of the first PDU) based on various values including a contention window value and a resource value. For example, a station that has a contention window value or a resource value less than the total amount of RUs of the first PDU is determined to be allocated the RU of the first PDU.

In various examples, the medium 211 may store instructions 214 executable by the processor 210 to update the resource value of the determined station based on an amount of the RU allocated to the determined station. In some examples, the medium 211 may further store instructions executable by the processor 210 to update the resource value of the determined station based on a request from the determined station. For example, the resource value of the determined station may be updated based on the request from the determined station prior to performing the resource allocation of the second PDU, and for instance, subsequent to allocating all RUs of the first PDU.

Instructions stored in the medium 211 can be repetitively performed to allocate the total amount of RUs of the first PDU. For example, a first iteration can be performed by executing the allocate instruction 212 and the update instruction 214 (e.g., sequentially). Subsequent to executing the allocate instruction 212 and the update instruction 214 stored in the medium 211, a second iteration can be performed by executing the allocate instruction 212 and the update instruction 214 responsive to determining a total amount of RUs allocated from the first PDU is less than the total amount of RUs of the first PDU. That is, the second iteration can be performed based on the updated resource value of the determined station (e.g., the resource value updated from executing the update instruction 214 in the first iteration).

In various examples, the medium 211 may further store instructions executable by the processor 210 to update the contention window value of each station associated with the access point responsive to determining the total amount of RUs allocated from the first PDU equals to the total amount of RUs of the first PDU. For example, when all RUs of the first PDU is allocated to the determined stations, the contention window value can be updated to a greater of a sum of the contention window value and the amount of the RU allocated to the determined station less the total amount of RUs of the first PDU or zero. As such, instructions stored in the medium 211 can be executed to perform a first iteration of a resource allocation of a second PDU based on the updated contention window value of each station.

Figure 3:
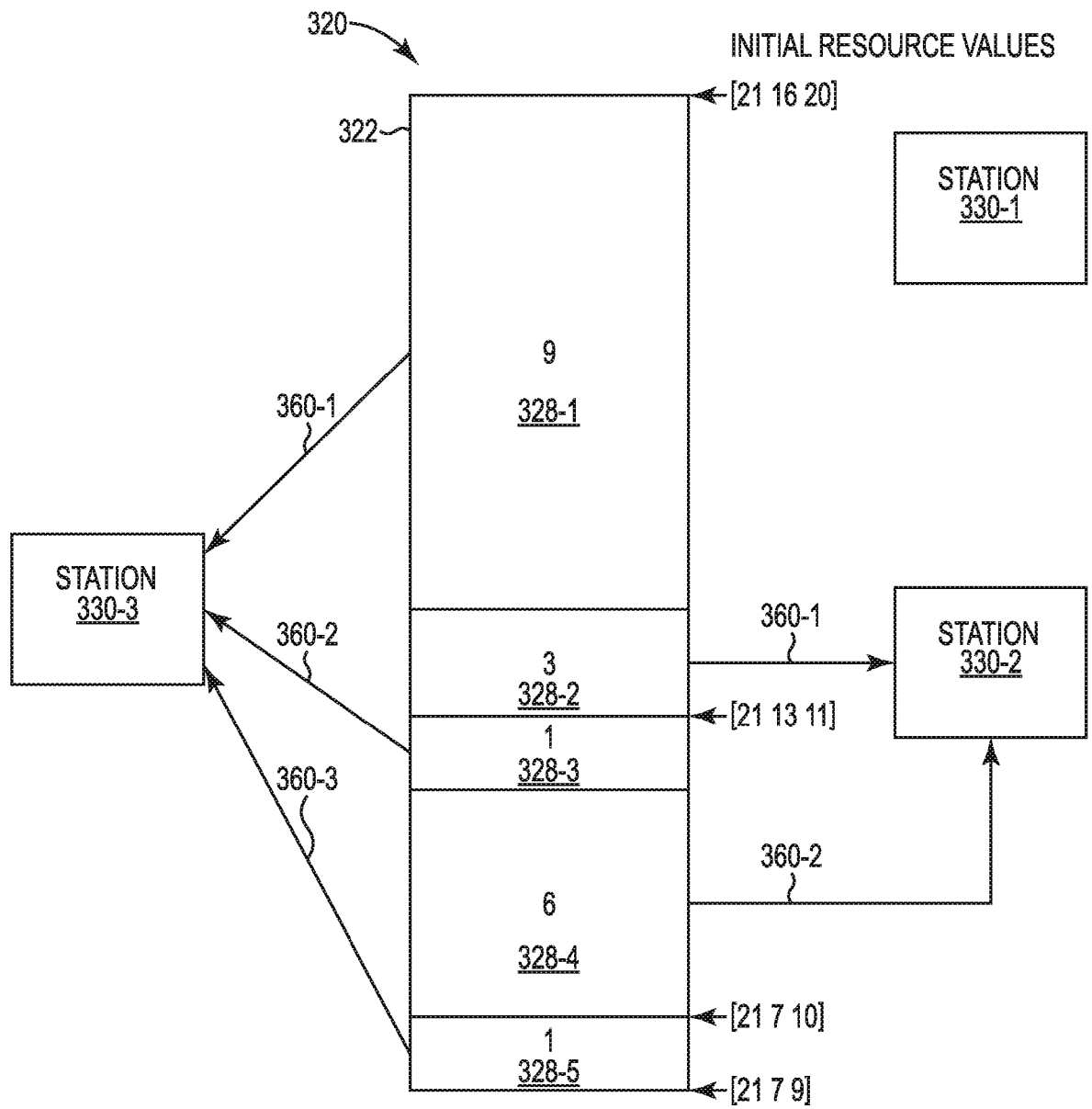
FIG. 3 illustrates a diagram of an example of a contention-based resource allocation according to the disclosure.

FIG. 3 illustrates a diagram of an example of a contention-based resource allocation. Although examples are not so limited, the example access point 320 may include a PDU 322 including 20 RUs, and is associated with stations 330-1, 330-2, and 330-3. As such, FIG. 3 illustrates a resource allocation of the PDU 322 to the stations 330-1, 330-2, and 330-3. The contention-based resource allocation illustrated in FIG. 3 are analogous to those methods and/or instructions illustrated in association with FIG. 1 and FIG. 2.

The example of performing the resource allocation of FIG. 3 is based on a scenario that a resource value of each station is initially [21 16 20], as shown in FIG. 3. For example, the resource value of the first station (e.g., station 330-1) is 21, the resource value of the second station (e.g., station 330-2) is 16, and the resource value of the third station (e.g., station 330-3) is 20. Similarly, in the assumed scenario, a RU limit and a contention window value of each station (e.g., 330-1, 330-2, and 330-3) is [10 14 9] and [25 22 20], respectively.

Prior to allocating RUs of the PDU 322, a network device (e.g., a controller) determines a station (among a plurality of stations associated with the access point 320) to which a RU of the PDU 322 is to be allocated. In various examples, the station is determined if its resource value or contention window value is not greater than a total amount of RUs of the PDU 322, as described herein. For example, the resource value (e.g., 21) and the contention window value (e.g., 25) of the station 330-1 are both greater than a total amount of RUs (e.g., 20) of the PDU 322. As such, the station 330-1 is not determined for the resource allocation of the PDU 322. On the other hand, the resource value (e.g., 16) of the station 330-2 is not greater than the total amount of RUs (e.g., 20) of the PDU 322, even though the contention window value (e.g., 22) of the station 330-2 is greater than the total amount of RUs. As such, the station 330-2 is determined for the resource allocation of the PDU 322. Similarly, the station 330-3 is determined for the resource allocation of the PDU 322 because its resource value (e.g., 20) and contention window (e.g., 20) are not greater than the total amount of RUs (e.g., 20) of the PDU 322. As a result, in various examples, the station 330-1 is not allocated a RU until all RUs of the PDU are allocated to the station 330-2 or 330-3, or both.

In some examples, a station may be throttled (e.g., controlled) from being allocated (e.g., scheduled and transmitted) a RU of an AP based on a gap between an amount of RUs allocated to the station and a resource value of the station exceeds a threshold. For example, a contention window value of the station may be throttled to allocate a greater amount of RUs (e.g., than it would have been allocated according to the disclosure when not throttled based on the gap). For example, an arrival rate (e.g., a frequency at which information such as data packets are generated) of the station may be throttled to be reduced by half per every 10th PDU if the resource value is still greater than 10. As such, the throttling mechanism employing various examples further reduces the gap between the amount of RUs allocated to the station and the resource value of the station.

Upon determining the station 330-2 and 330-3 for the resource allocation of the PDU 322, a first iteration 360-1 of the resource allocation is performed. Performing the first iteration 360-1 of the resource allocation includes determining an amount of RUs to be allocated to each determined station.

In various examples, a plurality of methods may be employed in determining a particular order in which the resource allocation of the PDU 322 is performed among the determined stations. For example, the resource allocation of the PDU 322 may be performed in a descending order such that a station (e.g., of the determined stations) having a resource value greater than those of other stations (e.g., of the determined stations) is allocated first. In some examples, the resource allocation of the PDU 322 may be performed in an ascending order such that a station having a resource value less than those of other stations is allocated first. In some examples, a particular order may be randomly determined. Although examples are not so limited, in the assumed scenario, the resource allocation of the PDU 322 may be performed in a descending order such that the station 330-3 having a greater resource value (e.g., 20) than that of the station 330-2 (e.g., 16) is allocated first (e.g., prior to allocating to the station 330-2).

Turning back to determining an amount of RUs of the PDU 322 to allocate to each station, firstly, a user parameter of the station 330-3 is determined. As described herein, the user parameter is a lesser of the resource value or a value of a RU limit of the determined station. For example, determining the user parameter can be performed as follows:

$$\text{mini} = \min(rem_i, RU_{limit}{}^i) \quad \quad 1)$$

In this example, mini represents the user parameter, and min represents a determination of a lesser of values within the parenthesis. As such, min determines a lesser of $rem_i$ or $RU_{limit}{}^i$, which represents the resource value and the RU limit of a respective station I, respectively. Turning back to the scenario as herein, the user parameter of the station 330-3 is a lesser of 20 (e.g., resource value of the station 330-3) or 9 (e.g., the value of the RU limit of the station 330-3). As such, the user parameter of the station 330-3 is "9".

Secondly, upon determining the user parameter for the station 330-3 (e.g., 9), the user parameter is compared to a value of an available RU of the PDU 322 (e.g., an amount of available RU). For example, comparing the user parameter to the value of the available RU of a respective PDU (e.g., PDU 322) can be performed as follows:

| | |
|---|---|
| 2) | if(tot + mini) > R then |
| 3) | $RU_i$ = min( mini − (R − tot), R − tot) |
| 4) | else |
| 5) | $RU_i$ = mini |

In this example, tot represents an amount of RUs allocated from a respective PDU (e.g., PDU 322) and R represents a total amount of RUs of a respective PDU (e.g., PDU 322). As such, R−tot represents a value of an available RU of a respective PDU (e.g., PDU 322). In sum, an amount of RUs to be allocated equals to a number value of a lesser of a value of the user parameter less a value of the available RU or the value of the available RU to the determined station responsive to determining that the user parameter is greater than the available RU. Otherwise, an amount of RUs to be allocated equals to a numeric value of the user parameter to the determined station responsive to determining that the user parameter is not greater than the available RU. As described herein, the available RU of the PDU 322 refers to an amount of RUs not allocated to any station yet.

Turning back to the scenario, since not a single RU has been allocated to any station associated with the PDU 322, the value of the available RU of the PDU 322 is 20 (e.g., equal to a total amount of RUs of the PDU 322) at this moment, and the user parameter (e.g., 9) of the station 330-3 is determined to be not greater than the value of the available RU of the PDU 322. As such, the station 330-3 is allocated an amount of RUs equal to a numeric value of the user parameter of the station 330-3 to the station 330-3. For example, since the user parameter of the station 330-3 is determined to be "9" previously, 9 RUs of the PDU 322 are allocated to the station 330-3 in the first iteration 360-1. As such, an amount of RUs 328-1 (e.g., including 9 RUs as shown in FIG. 3) of the PDU 322 is allocated (e.g., scheduled and transmitted) to the station 330-3.

In various examples, a network device (e.g., controller) may determine which RUs of the PDU 322 to allocate to a respective station. For example, although the station 330-3 is allocated first 9 RUs of the PDU 322, the network device may determine to allocate different portion of the PDU 322. Determining which RUs to allocate to a respective station may be based on a channel state condition between an AP and a respective station and/or a delay constraints of the respective station. For instance, the station with a tight delay constraint may be allocated a RU of a PDU that has an earlier time to expiry than other RUs of the PDU.

Upon allocating to the station 330-3, an amount of RUs to be allocated to the station 330-2 is then determined pursuant to the descending order. As described herein, the user parameter of the station 330-2 is determined in accordance with the equation 1. For example, a resource value (e.g., 16) and a value of a RU limit (e.g., 14) of the station 330-2 is compared, and the value of the RU limit of the station 330-2 is determined to be the user parameter. As such, the user parameter of the station 330-2 is determined to be "14."

As described herein, the user parameter of the station 330-2 is then compared to a value of an available RU of the PDU 322 in accordance with equations 2, 3, 4, and 5. Unlike to the station 330-3, the user parameter of the station 330-2 (e.g., 14) is greater than a value of an available RU of the PDU 322 (e.g., the available RU of the PDU 322 is 11 since 9 RUs were already allocated to the station 330-3). As such, in accordance with equations 2 and 3, the station 330-2 is allocated an amount of RUs equal to a numeric value of a lesser of a value of the user parameter less a value of the available RU or the value of the available RU. For example, a value of the user parameter (e.g., 14) of the station 330-2 less a value of the available RU (e.g., 11) is "3", and the value of the available RU is "11." As such, a lesser of those two values is "3," and 3 RUs of the PDU 322 are allocated to the station 330-2 in the first iteration 360-1. Therefore, an amount of RUs 328-2 (e.g., including 3 RUs as shown in FIG. 3) of the PDU 322 is allocated (e.g., scheduled and transmitted) to the station 330-2.

Upon allocating an amount of RUs of the PDU 322 in the first iteration 360-1, the resource value of each determined station 330-2 and 330-3 is updated based on an amount of the RU allocated to each of the stations 330-2 and 330-3. For example, since the station 330-2 is allocated 3 RUs in the first iteration 360-1, the resource value of the station 330-2 is updated to "13" (e.g., 16–3). Similarly, the resource value of the station 330-3 is updated to "9" (e.g., 20–11). As a result, resource values of stations 330-1, 330-2, and 330-3 are updated to [21 13 11], as shown in FIG. 3.

Upon updating the resource value of each determined station, the first iteration 360-1 is completed and a second iteration 360-2 is performed based on the updated resource value responsive to determining a total amount of RUs allocated from the first PDU is less than the total amount of RUs of the PDU 322. Since the PDU 332 still includes 8 RUs that are not allocated to a station, the second iteration 360-2 is performed to allocate at least a portion of remaining RUs of the PDU 322.

In the second iteration 360-2, equations 1, 2, 3, 4, and 5 are repeated based on the updated resource value. For example, the user parameter of the station 330-3 is determined to be "9," which is a lesser of the updated resource value (e.g., 11) or the value of the RU limit (e.g., 9). Further, since 12 RUs are allocated in the first iteration 360-1, a value of an available RU is 8 (e.g., 20–12=8). As such, the user parameter (e.g., 9) of the station 330-3 is greater than a value of an available RU, and in accordance with the equations 2 and 3. Therefore, the station 330-3 is allocated 1 RU of the PDU 322 in the second iteration 360-2, which is a lesser of a value of the user parameter (e.g., 9) less a value of the available RU (e.g., 1) or the value of the available RU (e.g., 8). As such, an amount of RUs 328-3 (e.g., including 1 RU as shown in FIG. 3) of the PDU 322 is allocated (e.g., scheduled and transmitted) to the station 330-3.

Similarly, the user parameter of the station 330-2 is determined to be "13," which is a lesser of the updated resource value (e.g., 13) or the value of the RU limit (e.g., 14). Further, since 13 RUs are allocated from the PDU 322, a value of an available RU is 7 (e.g., 20–13=7). As such, the user parameter (e.g., 13) of the station is greater than a value of an available RU, and in accordance with the equations 2 and 3. Therefore, the station 330-2 is allocated 6 RU of the PDU 322 in the second iteration 360-2, which is a lesser of a value of the user parameter (e.g., 13) less a value of the available RU (e.g., 7) or the value of the available RU (e.g., 6). As such, an amount of RUs 328-4 (e.g., including 6 RUs as shown in FIG. 3) of the PDU 322 is allocated (e.g., scheduled and transmitted) to the station 330-2.

Upon allocating an amount of RUs of the PDU 322 in the second iteration 360-2, the resource value of each of the stations 330-2 and 330-3 is updated based on an amount of the RU allocated to each of the stations 330-2 and 330-3. For example, since the station 330-2 is allocated 6 RUs in the second iteration 360-2, the resource value of the station 330-2 is updated to "7" (e.g., 13–6). Similarly, the resource value of the station 330-3 is updated to "10" (e.g., 11–1). As a result, resource values of stations 330-1, 330-2, and 330-3 are updated to [21 7 10], as shown in FIG. 3.

Upon updating the resource value of each of the stations 330-2 and 330-3, the second iteration 360-2 is completed and a third iteration 360-3 is performed based on the updated resource value responsive to determining a total amount of RUs allocated from the first PDU is less than the total amount of RUs of the PDU 322. Since there is 1 RU available to be allocated, the third iteration 360-3 is performed to allocate the last RU of the PDU 322.

In the third iteration 360-3, 1 remaining RU of the PDU 322 is allocated to the station 330-3 as the station 330-3 is granted a priority over the station 330-2 pursuant to the descending order. For example, a resource allocation performed according to the equations 1, 2, 3, 4, and 5 would result allocating 1 RU of the PDU 322 to the station 330-3, and no allocation to the station 330-2. As such, an amount of RUs 328-5 (e.g., including 1 RU as shown in FIG. 3) of the PDU 322 is allocated (e.g., scheduled and transmitted) to the station 330-3. As a result, resource values of stations 330-1, 330-2, and 330-3 are updated to [21 7 9], as shown in FIG. 3.

Subsequent to allocating a total amount of RUs of the PDU 322, the resource values of the station 330-1, 330-2, and 330-3 can be updated further based on a request in addition to an amount of RUs actually allocated to a respective station. For example, the station 330-1 and 330-3 may further request 5 and 3 RUs in addition to an amount of RUs already allocated. As such, in this example, those requests may be reflected such that the resource values updated subsequent to allocating during the third iteration 360-3 (e.g., [21 7 9]) can be further updated to [27 7 12]. The resource values can be updated based on those requests, for instance, prior to allocating a RU of another PDU.

Upon allocating a total amount of RUs of the PDU 322, the contention window value of each station 330-1, 330-2, and 330-3 can be updated. For example, updating the contention window value can be performed as follows:

$$CW_i = \max(CW_i + RU_i - R, 0) \quad 6)$$

In this example, $CW_i$ represents a contention window value of a station i. Further, max represents a determination of a greater of values within the parenthesis. As such, max determines a greater of $CW_i + RU_i - R$ or 0. As such, the contention window values of the stations 330-1, 330-2, and 330-3 are updated to 5, 11, and 11, respectively in accordance with the equation 6.

Although not illustrated in FIG. 3, an iteration can be performed to allocate a RU of another PDU based on the updated contention window values. For example, the access point 320 may include another PDU (e.g., a second PDU that is not illustrated in FIG. 3) other than the PDU 322, and another resource allocation may be performed on the second PDU to allocate a RU of the second PDU. In this example, the station 330-1, 330-2, and 330-3 are determined for the resource allocation of the second PDU since the station 330-1, 330-2, and 330-3 have a respective contention window value or resource value that is less than a total amount of RUs of the second PDU. As such, the station 330-1 that was previously not determined for the resource allocation of the PDU 322 is now determined for the resource allocation of the second PDU such that the station 330-1 may be allocated a RU of the second PDU based on various values.

Figure 4:
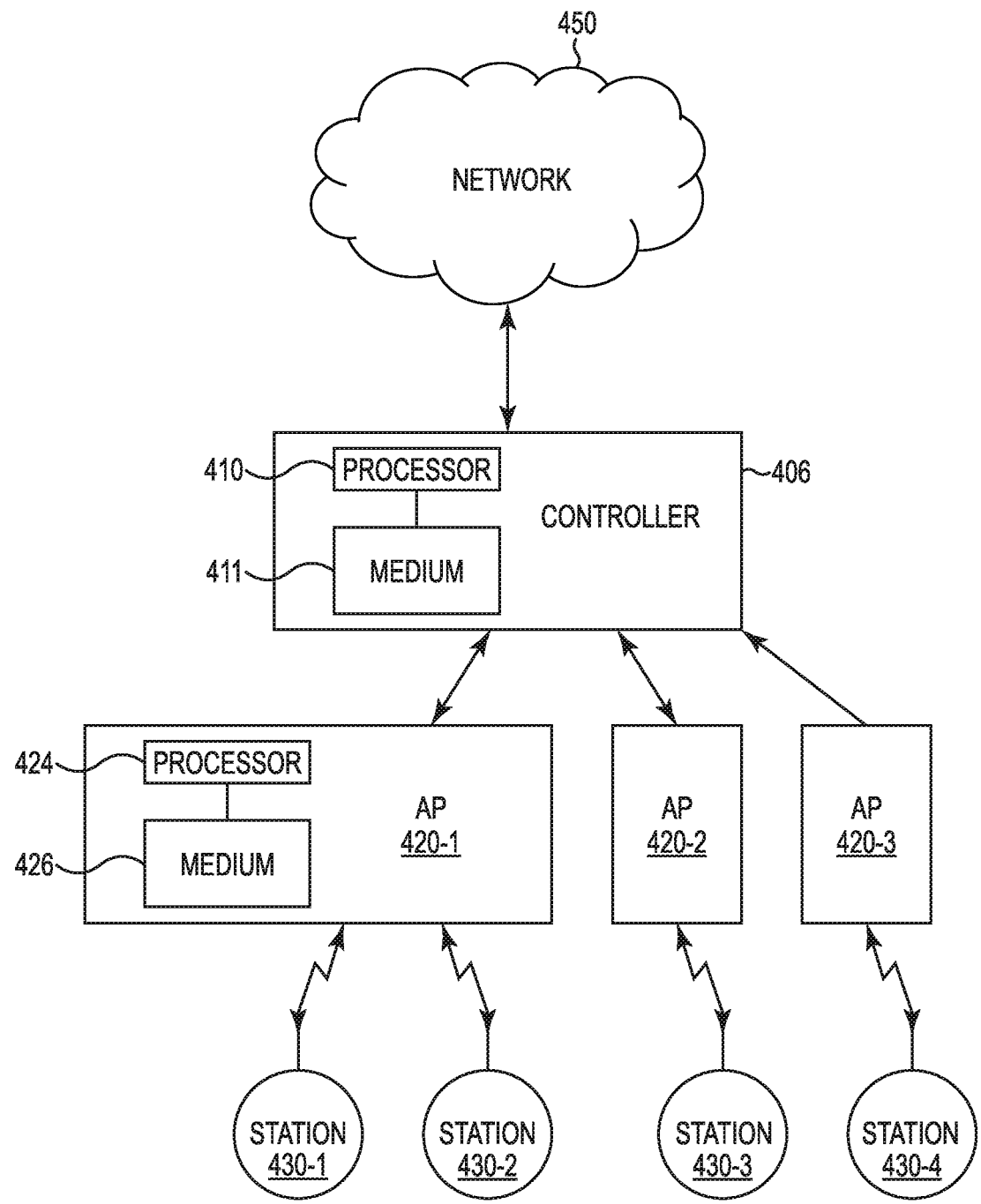
FIG. 4 illustrates a diagram of an example of a wireless network according to the disclosure.

FIG. 4 illustrates a diagram of an example of a wireless network 450 according to the disclosure. Wireless network 405 may include a controller 406, APs 420-1, 420-2, 420-3 (referred to generally herein as APs 420), and stations 430-1, 430-2, 430-3, 430-4 (referred to generally herein as stations 430).

As illustrated in FIG. 4, APs 420 can include a processor 424 and a non-transitory computer readable medium (e.g., memory) 426, among other possible components (not illustrated) such as input-output interfaces, etc. Further, the APs 420 can include resources in which information may be transmitted to a respective station in a particular data unit. As used herein, 'information' is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

The APs may transmit the information to a respective station in various types of data units. For example, the APs 420 may transmit the information in a data unit referred to as a PDU in OFDM, for instance. In OFDMA, in which the PDU is shared among stations 430 associated with a respective AP (e.g., stations 430-1 and 430-2 associated with the AP 420-1), the information may be transmitted in a data unit referred to as a RU, as described herein. For example, each PDU can include an amount of RUs. Each data unit is considered as a resource, and in various examples, resources of the access point 420 can be allocated to a station 430 associated with the access point 420. For example, resources of the access point 420-1 can be shared among the stations 430-1 and 430-2 that are associated with the access point 420-1, as shown in FIG. 4. Similarly, resources of an AP 420-2 and 420-3 can be allocated to a station 430-3 and 430-4, respectively.

As indicated by the lines between the AP 420 and the stations 430, the APs 420 can provide wireless connectivity to the station 430 in the wireless network 450. Similarly, the stations 430 can be in wireless communication with the controller 406. For instance, the stations 430 can be in wireless communication with the controller 406 via the APs 420, as illustrated in FIG. 4.

While FIG. 4 illustrates a particular quantity of controller 406, APs 420, and stations 430, the disclosure is not so limited. Rather, a total quantity of the controller 406, the APs 420, and/or the stations 430 can be varied to include more or less controllers 406, APs 420, and/or stations 430.

Figure 5:
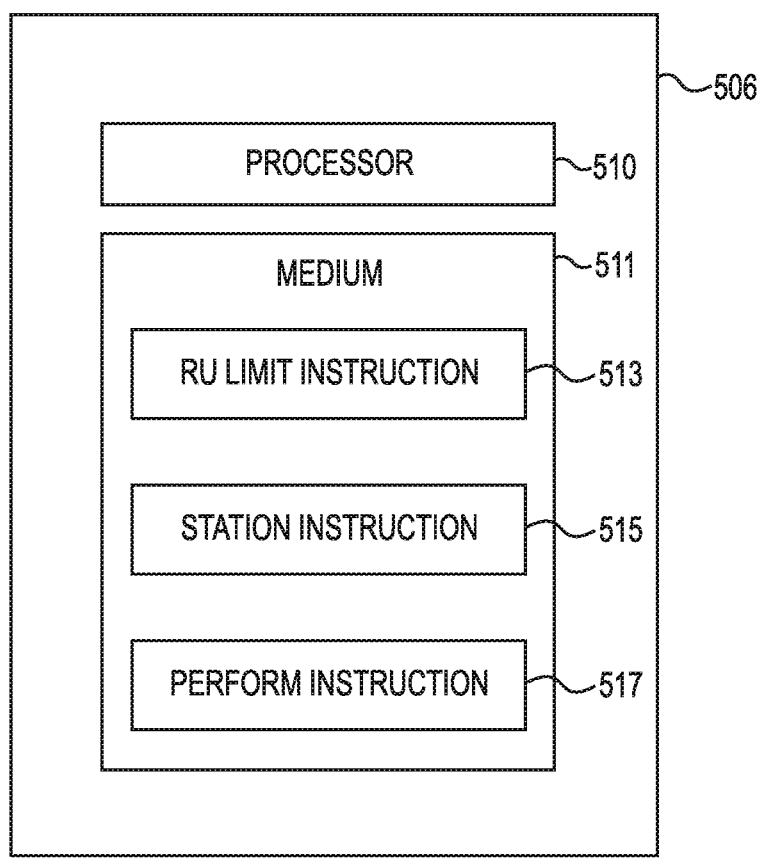
FIG. 5 illustrates a diagram of an example of a controller according to the disclosure.

FIG. 5 illustrates a diagram of an example of a controller 506 according to the disclosure. A controller 506 can include a processor 510 and a medium 511, among other possible components (not illustrated) such as input-output interfaces, etc. The processor 510 and the medium 511 can be analogous to the processor 210 and the non-transitory computer readable medium 211 as described in association with FIG. 2.

The processor 510 (i.e., processing resource and/or hardware processor) may execute instructions (e.g., RU limit instructions 513) stored on the medium 511. The medium 511 can be any type of volatile or non-volatile memory or storage, such as random access memory (RAM), flash memory, read-only memory (ROM), storage volumes, a hard disk, or a combination thereof.

The medium 511 can include RU limit instruction 513, station instruction 515, and perform instruction 517, although examples are not so limited. The Ru limit instruction 513 can include instructions to cause the processor 510 to determine a resource unit (RU) limit of each of stations associated with the access point. The station instruction 515 can include instructions to cause the processor 510 to determine a station of the stations having a contention window value or a resource value less than a total amount of RUs of a respective PDU of an access point. The perform instruction 517 can include instructions to cause the processor 510 to perform a resource allocation of the respective PDU based on a user parameter equal to a lesser of the resource value or a value of the determined RU limit of the determined station, as described herein.

In various examples, the medium 511 can include instruction to cause the processor 510 to determine a RU limit of each of the stations based on various types of normalizations of a resource value of a respective station. For example, a first type of normalization (e.g., Min-Max normalization) can perform a linear transformation on a resource value of each of the stations (e.g., a vector value including a resource value of each associated station) such that the vector value at an interval [$min_r$, $max_r$.] is transformed to a vector value at an interval [0, 1]. In various examples, the transformed vector value may be biased such that each constituents of the vector is greater than a numeric value "0."

In a second type of normalization, (e.g., Z-score normalization), the vector value is normalized based on the mean and standard deviation of the vector. For example, the Z-score normalization can be performed as follows:

$$v_{RUlimit} = (v_r - r)/o'_r$$

In this example, $v_r$ represents a vector value including a resource value of each associated station, r represents mean value of the vector $v_r$, and $o'_r$ represents a standard deviation value of the vector $v_r$. As such, RU limit of each associated station (e.g., $v_{RUlimit}$) is determined, as described herein. In various examples, the determined vector value may be biased such that each constituents of the vector is greater than a numeric value "0."

In a third type of normalization (e.g., norm-normalization), a vector value including a resource value of each associated station is normalized based on the norm of the vector. For example, each constituent of the vector (e.g., representing a resource value of a respective station) is divided by the norm of the vector as follows:

$$v_{RUlimit} = v_r / \|v_r\|$$

In this example, $\|v_r\|$ represents a norm value of the vector value $v_r$ including a resource value of each associated station. Although various examples are illustrated as a determination of a RU limit, examples are not so limited. For example, based on various criteria, a RU limit of each associated station may be determined differently.

In various examples, the medium 511 can include instructions to cause the processor 510 to update a contention window value of stations associated with the access point based on a channel state information associated with a respective station. For example, a contention window value of the respective station may be updated to a lower value (e.g., than it would have been when updated according to the disclosure describe herein) responsive to determining that the channel state information of the station indicates a high class of service (e.g., having few or no transmission failures within a channel linked between the AP and the station). A channel state information associated with the stations can include information associated with a state of the channel between the AP and the stations associated with the AP. The state of the channel may be determined based on information associated with a RU allocated (e.g., scheduled and transmitted) to the respective station from the AP.

As described herein, the medium 511 can include instructions to cause the processor 510 to perform the resource allocation among the determined stations in a particular order. In various examples, the particular order is determined based on a resource value of each determined station. For example, the particular order can be a descending order such that a station having a greater resource value other than that of other stations is allocated a resource (e.g., RU) first. For example, the particular order can be an ascending order such that a station having a lesser resource value other than that of other stations is allocated a resource first. In some examples, the particular order may be a random order.

In the foregoing detailed description of the disclosure, reference is made to the accompanying drawings that form a part hereof, and in which is shown by way of illustration how various examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure.

As used herein, designators such as "N", etc., particularly with respect to reference numerals in the drawings, can, for example, indicate that a number of the particular feature so designated can be included. The figures herein follow a numbering convention in which the first digit corresponds to the drawing figure number and the remaining digits identify an element or component in the drawing. Elements shown in the various figures herein can be added, exchanged, and/or eliminated so as to provide an additional example of the disclosure. In addition, the proportion and the relative scale of the elements provided in the figures are intended to illustrate the example of the disclosure, and should not be taken in a limiting sense. Multiple like elements may be referenced herein generally by their reference numeral without a specific identifier at the end. For example, a plurality of stations 108-A, . . . , 108-D may be referred to herein generally as stations 108.

What is claimed:

1. A processor-implemented method to allocate transmit resources of an access point between a plurality of stations associated with the access point, comprising:
    determining, by one or more network devices comprising a processor, a contention window value and a resource value associated with each of the plurality of stations;
    selecting, from the plurality of stations, a subset of stations for which the contention window value is less than a total amount of resource units (RU) of a protocol data unit (PDU) of the access point, and the resource value is less than the total amount of RUs of the protocol data unit (PDU) of the access point;
    initiating, by the one or more network devices, an iterative process to allocate resource units of the protocol data unit between the subset of stations, the iterative process comprising:
        a first resource allocation iteration to allocate available resource units of the protocol data unit between the subset of stations in descending order of the resources values associated with each station in the subset of stations, wherein the first allocation iteration allocates a number of resources units corresponding to a user parameter that is equal to one of a lesser of the resource value and a value of a resource unit limit of the station;
        a first update process to generate an updated resource value associated with each of the stations in the subset of stations based on the number of resource units allocated to each of the stations in the subset of stations in the first resource allocation iteration; and
        a second resource allocation iteration to allocate available resource units of the protocol data unit between the subset of stations in descending order of the updated resources values associated with each station in the subset of stations.

2. The method of claim 1, further comprising reducing a contention window value for an access point prior to initiating the iterative process to allocate resource units.

3. The method of claim 2, further comprising reducing an arrival rate of a station to which data packets are directed.

4. The method of claim 1, further comprising initiating second update process to generate an updated resource value associated with each of the stations in the subset of stations based on the number of resource units allocated to each of the stations in the subset of stations in the second resource allocation iteration.

5. The method of claim 4, further comprising initiating a third resource allocation iteration to allocate any remaining available resource units of the protocol data unit between the subset of stations in descending order of the updated resources values associated with each station in the subset of stations.

6. A non-transitory machine readable storage medium storing instructions to cause a computer processor to perform a first iteration of a resource allocation of a first protocol data unit (PDU), the instructions to perform operations comprising:
- determining, by one or more network devices comprising a processor, a contention window value and a resource value associated with each of the plurality of stations;
- selecting, from the plurality of stations, a subset of stations for which the contention window value is less than a total amount of resource units (RU) of a protocol data unit (PDU) of the access point, and the resource value is less than the total amount of RUs of the protocol data unit (PDU) of the access point;
- initiating, by the one or more network devices, an iterative process to allocate resource units of the protocol data unit between the subset of stations, the iterative process comprising:
  - a first resource allocation iteration to allocate available resource units of the protocol data unit between the subset of stations in descending order of the resources values associated with each station in the subset of stations, wherein the first allocation iteration allocates a number of resources units corresponding to a user parameter that is equal to one of a lesser of the resource value and a value of a resource unit limit of the station;
  - a first update process to generate an updated resource value associated with each of the stations in the subset of stations based on the number of resource units allocated to each of the stations in the subset of stations in the first resource allocation iteration; and
  - a second resource allocation iteration to allocate available resource units of the protocol data unit between the subset of stations in descending order of the updated resources values associated with each station in the subset of stations.

7. The non-transitory machine readable storage medium of claim 6, including instructions to perform operations comprising reducing a contention window value for an access point prior to initiating the iterative process to allocate resource units.

8. The non-transitory machine readable storage medium of claim 7, including instructions to perform operations comprising reducing an arrival rate of a station to which data packets are directed.

9. The non-transitory machine readable storage medium of claim 6 including instructions to perform operations comprising initiating second update process to generate an updated resource value associated with each of the stations in the subset of stations based on the number of resource units allocated to each of the stations in the subset of stations in the second resource allocation iteration.

10. The non-transitory machine readable storage medium of claim 9, including instructions to perform operations comprising initiating a third resource allocation iteration to allocate any remaining available resource units of the protocol data unit between the subset of stations in descending order of the updated resources values associated with each station in the subset of stations.

11. A controller, comprising: a processor; and a non-transitory medium storing machine-readable instructions to cause a network device comprising the processor to perform operations comprisinq: determininq a contention window value and a resource value associated with each of the plurality of stations; selecting, from the plurality of stations, a subset of stations for which the contention window value is less than a total amount of resource units (RU) of a protocol data unit (PDU) of the access point, and the resource value is less than the total amount of RUs of the protocol data unit (PDU) of the access point; initiating an iterative process to allocate resource units of the protocol data unit between the subset of stations, the iterative process comprising: a first resource allocation iteration to allocate available resource units of the protocol data unit between the subset of stations in descending order of the resources values associated with each station in the subset of stations, wherein the first allocation iteration allocates a number of resources units corresponding to user parameter that is equal to one of a lesser of the resource value and a value of a resource unit limit of the station; a first update process to generate an updated resource value associated with each of the stations in the subset of stations based on the number of resource units allocated to each of the stations in the subset of stations in the first resource allocation iteration; and a second resource allocation iteration to allocate available resource units of the protocol data unit between the subset of stations in descending order of the updated resources values associated with each station in the subset of stations.

12. The controller of claim 11, the non-transitory medium further comprising instructions to perform operations comprising reducing a contention window value for an access point prior to initiating the iterative process to allocate resource units.

13. The controller of claim 12, the non-transitory medium further comprising instructions to perform operations comprising reducing an arrival rate of a station to which data packets are directed.

14. The controller of claim 11, the non-transitory medium further comprising instructions to perform operations comprising initiating second update process to generate an updated resource value associated with each of the stations in the subset of stations based on the number of resource units allocated to each of the stations in the subset of stations in the second resource allocation iteration.

15. The controller of claim 14, the non-transitory medium further comprising instructions to perform operations comprising initiating a third resource allocation iteration to allocate any remaining available resource units of the protocol data unit between the subset of stations in descending order of the updated resources values associated with each station in the subset of stations.

* * * * *